(12) United States Patent
Morrish (10) Patent No.: US 6,624,815 B1
(45) Date of Patent: Sep. 23, 2003

(54) SYSTEM, METHOD, AND APPARATUS FOR CREATING CHARACTER BOXES FOR ON SCREEN DISPLAYS

(75) Inventor: Andrew Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 492 days.

(21) Appl. No.: 09/651,950

(22) Filed: Aug. 31, 2000

(51) Int. Cl.[7] .................................................. G06T 11/00
(52) U.S. Cl. ....................................................... 345/467
(58) Field of Search ................................. 345/192, 716, 345/728, 754, 764, 783, 851, 855, FOR 189, 467, 468, 469, 469.1, 470, 551, 581, 636, FOR 114, FOR 116, FOR 117, FOR 947; 348/569

(56) References Cited

U.S. PATENT DOCUMENTS 5,371,849 A  12/1994 Peaslee et al.
5,860,075 A  1/1999 Hashizume et al.
6,281,876 B1  8/2001 Jones, Jr.
6,322,447 B1  11/2001 Okada et al.

OTHER PUBLICATIONS

Samsung, KS 2501 Data Sheet OSD Processor For Monitor, Mar. 1998, Samsung Electronics, pps. 1–25.*
Samsung Technical Paper, KS2501 OSD Processor For Monitor, Mar. 1998.

* cited by examiner

Primary Examiner—Matthew C. Bella
Assistant Examiner—G. F. Cunningham
(74) Attorney, Agent, or Firm—Vedder, Price, Kaufman & Kammholz, P.C.

(57) ABSTRACT

A system, method, and apparatus for displaying a character on a television or monitor screen are presented. The contents from a first memory location are fetched to determine the character and character attributes to be displayed. A graphical representation for the character to be displayed is then retrieved and overwritten based on the character attribute information of the character and a second character, such as an adjacent character.

18 Claims, 6 Drawing Sheets

FIG. 9 ns collectively know as the RGB value.

SYSTEM, METHOD, AND APPARATUS FOR CREATING CHARACTER BOXES FOR ON SCREEN DISPLAYS

RELATED APPLICATIONS

The present application is related to co-pending, and commonly assigned U.S. patent application Ser. No. 09/651,953, entitled "Enhanced Color Palette for On-Screen Displays" filed Aug. 31, 2000, by Andrew Moorish, which is hereby incorporated by reference for all purposes.

FIELD

The present invention relates to visual displays, and more particularly to on-screen displays.

BACKGROUND

Typical graphical user interfaces in personal computer (PC) and workstation applications use selectively shaded borders to produce the effect of shadowed boxes around selected fields in order to highlight these fields to the user, and thus make the interface more ergonomic. Manipulation of the borders of these boxes can be chosen such that the box bordering the icon or text appears either raised or depressed, depending upon whether the top, bottom, and sides are shaded light or dark.

Computer applications typically create these effects using software, as opposed to hardware. However, graphical user interfaces are used by simple on-screen displays type devices that are used as the primary adjustment interfaces for PC monitors and television sets. The graphical user interfaces associated with on-screen displays are created and controlled by a controller indigenous to the monitor or television set. The controller typically creates the graphical user interface by a simple character generator, using a predetermined character set, and a small amount of page random access memory (RAM). The page RAM holds the information that defines the screen page that will be displayed. To reduce memory requirements, the page RAM contains character identifiers, such as an ASCII code, which reference a character set preprogrammed in ROM. The character set in the ROM contains the actual graphical pixel representation of each character.

As with computer applications, it is also desirable to simulate the shadowed box effect with graphical user interfaces associated with on-screen displays. The KS2501 "OSD Processor for Monitor" manufactured by Samsung uses three control bits at each character location in the page RAM to define how the box should by constructed.

Although providing a shadow box effect, the KS2501 has a number of disadvantages. Addition of three control bits per character position requires larger amounts of page RAM which is costly. Additionally, graphical limitations are imposed on the character boxes such that a box can only enclose a single line and must be rectangular in shape. The box also overwrites pixel information in the left and right columns and the top and bottom rows of the character. Finally, programming the controller becomes more complex when boxing a string of characters as the controller has to decide which box characteristic to use for every individual character.

Accordingly, it would be advantageous if the shadow box effect of the graphical user interface for an on-screen display could be generated which uses less page RAM.

It also would be advantageous if the shadow box effect of the graphical user interface for an on-screen display could be generated which permits more different types and shapes of boxes.

It also would be advantageous if the shadow box effect of the graphical user interface for an on-screen display could be generated which overwrites less pixel i information from each character.

It also would be advantageous if the shadow box effect of the graphical user interface for an on-screen display could be generated which requires less complex controller programming for implementation.

SUMMARY

The present invention is directed to a system, method, and apparatus for displaying a character on the screen of monitor or television. A display controller fetches the contents from a memory location in page random access memory (RAM) to determine the character, color palette, and character attributes to be displayed. The contents of the memory location are used to fetch a graphical representation of the character from a character read only memory, a color palette from the color palette lockup, and an enhanced feature register from an attribute table. The attributes are implemented by overwriting the graphical representation of the character, based on the enhanced features of the character and the enhanced features of at least a second character.

DETAILED DESCRIPTION OF PREFERRED EMBODIMENTS

Figure 1:
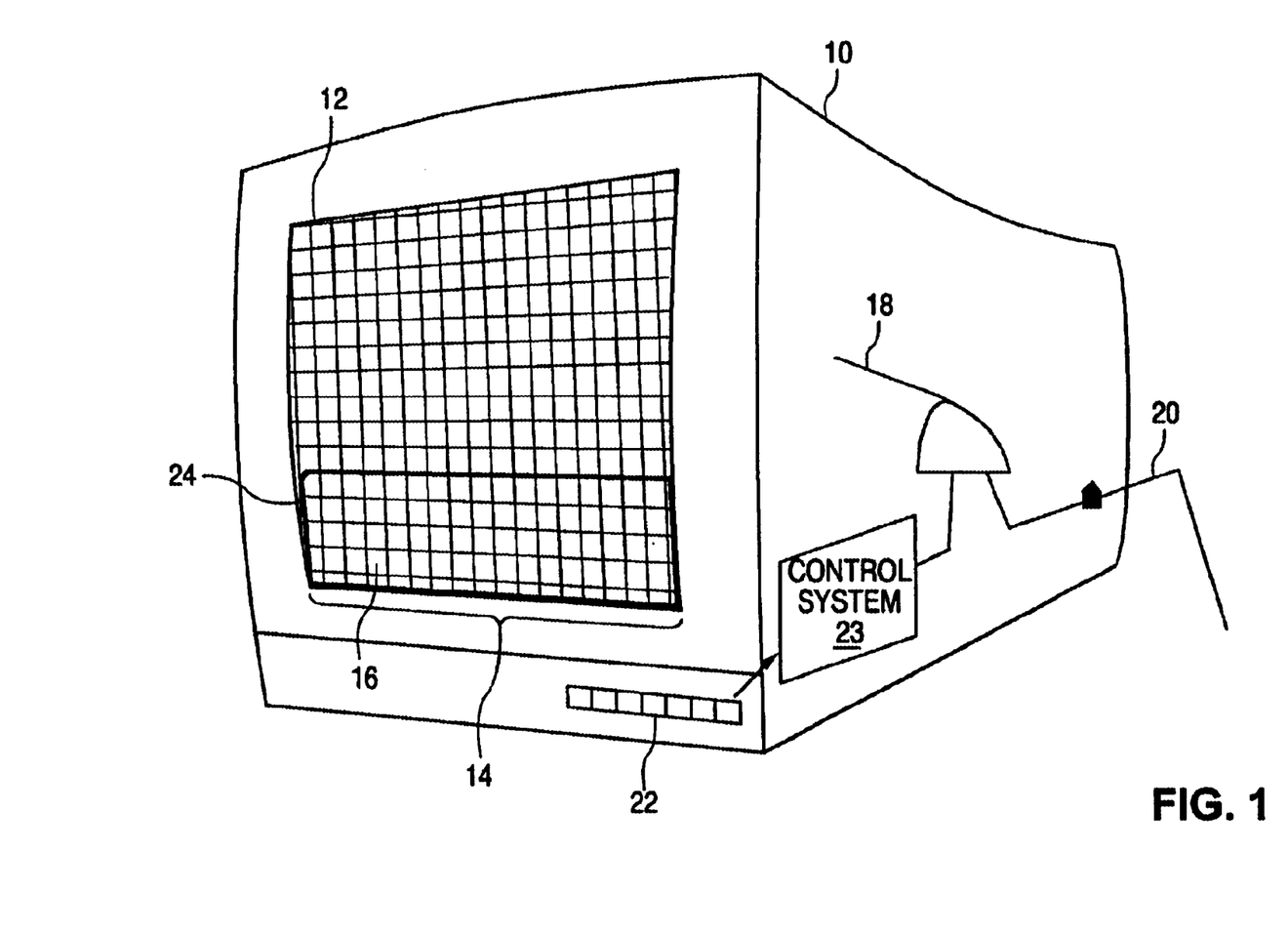
FIG. 1 is an exemplary monitor/television wherein the presently claimed invention can be practiced.

Referring now to FIG. 1, there is illustrated an exemplary monitor/television 10 wherein the present invention can be practiced. The monitor/television 10 displays sequentially a series of images on a screen 12 which together form a video. The screen 12 comprises any number of rows 14, known as raster lines. Each raster line 14 is a row of any number of pixels 16. A pixel 16 is the smallest and most basic element of the screen 12 and is capable of emitting a single color of light (or is black) at a given time. On a color monitor/television 10, the color of the pixel 16 is typically formed by a combination of the colors red, green, and blue. The range of colors for the pixel 16 can be realized by varying the relative intensities of the red, green, and blue components. The relative intensities of the red, green, and blue components are collectively know as the RGB value.

The pixels 16 of the screen 12 are caused to emit light be means of an electron gun 18. The electron gun 18 excites the material of the screen 12 forming the pixel 16, causing a photon of a particular color to be emitted. The electron gun 18 moves in a manner such that it sequentially excites each pixel 16 from the left to right, or vice versa, of a particular raster line 14. After the electron gun 18 has traversed the pixels 16 of a raster line 14, the electron gun traverses the pixels 16 of another raster line 14. This process is repeated until each raster line 14 has been traversed. In some monitors/televisions 10, the raster lines 14 are traversed in order from top to bottom, while on other monitors/televisions 10, the raster lines 14 are traversed in alternating order, i.e., all sequentially odd lines first, then even lines. When the electron gun 18 traverses each line, a single image is displayed. The electron gun 18 rapidly repeats this process causing a sequence of images to appear as a continuous video to the human eye.

The images for display on the monitor/television 10 are provided by an input source 20, such as an antenna, video output, cable, or terminal port. The input source 20 controls the colors emitted by each pixel 16, by appropriately controlling the electron gun 18. In addition to the input source 20, the monitor/television 10 also generates and displays on-screen displays from hardware integrated therein. The on-screen display is primarily used as a graphical user interface for controls and adjustments of monitor/television 10. Adjustments can be made to the monitor/television 10 by means of a control panel 22. The control panel 22 functions as an input wherein the user can input various adjustment selections, such as brightness, contrast, or volume. The control panel 22 transmits the input selections to a control system 23 which effectuates the user's selection. To assist the user in inputting their selections, the control systems 23 generates an on-screen display which guides the user.

The on-screen display occupies a predetermined region 24 of the screen 12, and the pixels 16 therein, and is usually displayed simultaneously with the images from the input source. Because images from the input source 20 include contents that are to be displayed in the on-screen display area 24, a resource contention arises. To resolve this resource contention, the monitor/television 10 selectively chooses to overwrite the input source 20 images with the on-screen display.

Although the present exemplary monitor/television 10 is a cathode ray tube monitor/television 10, it is noted that the present claimed invention can be practiced in other types of monitors/televisions 10 such as, but not limited to, flat panel monitors/televisions 10, projection monitors/televisions 10, and plasma terminal monitors/televisions 10.

Figure 2:
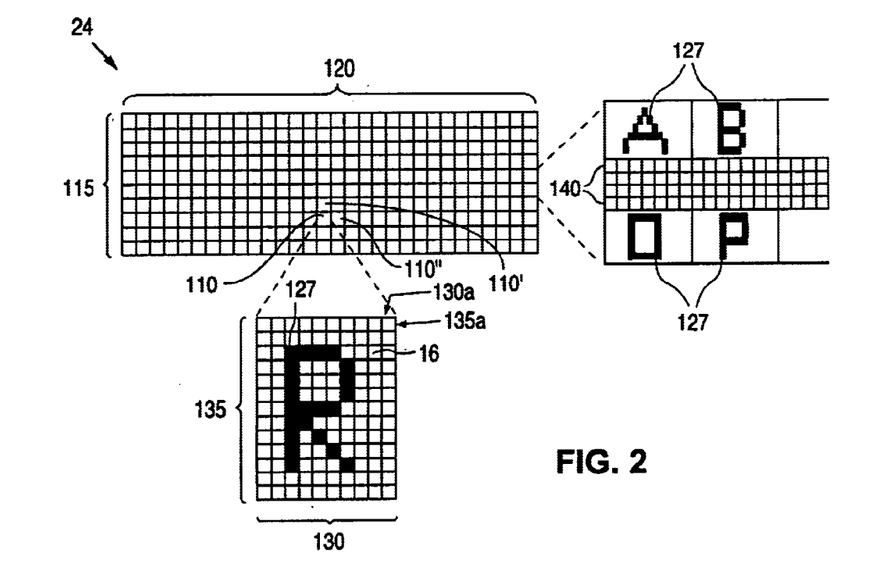
FIG. 2 is an block diagram of an exemplary on-screen display in accordance with the presently claimed invention.

Referring now to FIG. 2, there is illustrated a block diagram of an on-screen display 24 in accordance with the presently claimed invention. The on-screen display 24 is a grid comprising any number of character units 110 arranged in character rows 115 and character columns 120. Each character unit comprises a set of pixels 16 which together graphically display a single character 127. The pixels are arranged in pixel columns 130 and pixel rows 135. Each character unit 110 also includes a top row 135a and right column 130a. The top row 135a and right column 130a can be used to form a raised or depressed box as will be described below. In addition, between character rows 115, any number of contentless raster lines 14, or skip lines 140 may be inserted therebetween.

Figure 3:
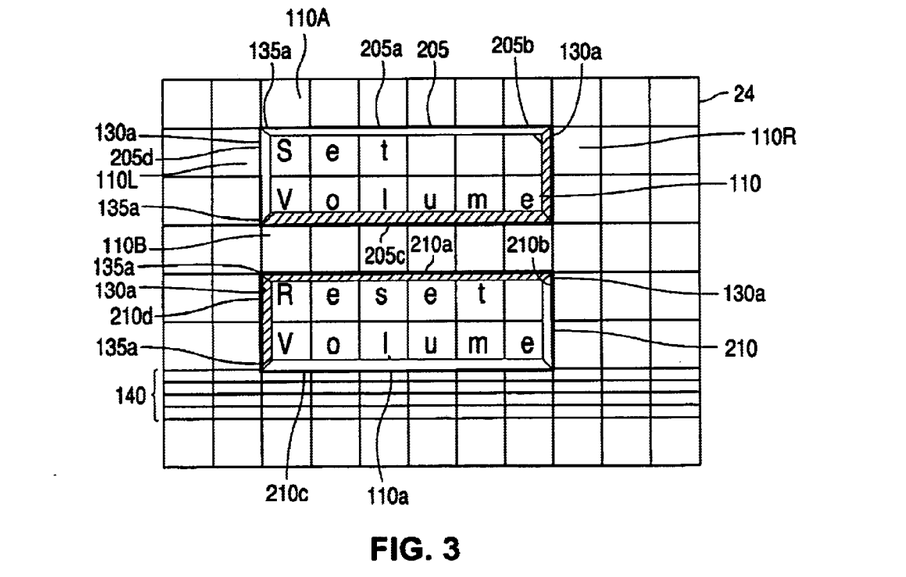
FIG. 3 is a block diagram of an exemplary on-screen display with shadow boxes in accordance with the presently claimed invention.

Referring now to FIG. 3, there is illustrated a block diagram of an on-screen display 24 with raised shadow boxes 205 and depressed shadow boxes 210 in accordance with the principles of the presently claimed invention. The shadow boxes 205, 210 are formed by the top row 135a, and right column 130a of any number of character units 110. Each of the shadow boxes 205, 210 includes a top edge 205a, 210a, a right edge 205b, 210b, a bottom edge 205c, 210c, and a left edge 205d, 210d.

The top edge 205a of the raised shadow box 205 is formed by highlighting the top row 135a of each character unit 110 which occupies the top row of the box 205, 210. The right edge 205b is formed lowlighting the right column 130a of each of the character units 110 which occupies the right edge 205b of the box 205. The bottom edge 205c is formed by lowlighting the top row 135a of the character units 110B which are immediately below the character units at the bottom of the box 205. The left edge 205d is formed by highlighting the right column 130a of the character units 110L which are immediately to the left of the character units 110 at the left edge of the box 205. The depressed box 210 is formed in a similar manner to the raised box 205, except that the right edge 210b and bottom edge 210c are highlighted and the top edge 210a and the left edge 210d are lowlighted. Where a skip line 140 exists immediately below a character unit 110, e.g. character unit 110a, the skip line 140 is highlighted/lowlighted appropriately to form the bottom edge, e.g. bottom edge 210c of the shadow box, e.g. shadow box 210.

Although the character units below 110B and to the left 110L of the character units 110 in the shadow box 210 are used to form the shadow boxes 205, 210, it is noted that any combination of a vertically adjacent character unit 110 and a horizontally adjacent character 110 can be used to form the shadow box 210. For example, the shadow boxes 205, 210 can be formed by highlighting or lowlighting the left pixel column 130 of the character unit 110 immediately to the right 1110R and the bottom pixel row 135 of the character unit 110 immediately above 110A the character unit 110.

Figure 4:
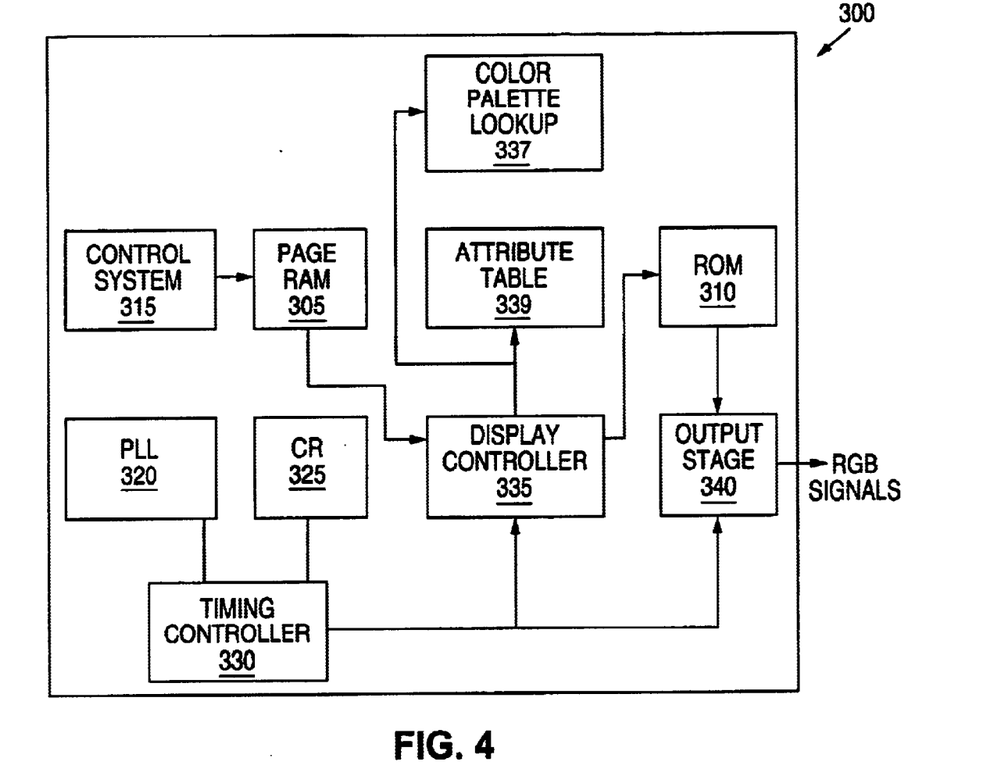
FIG. 4 is a block diagram of an on-screen display system in accordance with the presently claimed invention.

Referring now to FIG. 4, there is illustrated a block diagram of an On-Screen Display System, referred to generally by the reference numeral 300, for displaying an on-screen display in a predetermined region 24 of a screen 12 on a monitor/television 10 in accordance with the principals of the presently claimed invention. The on-screen display system 300 includes page Random Access Memory (RAM) 305, Read Only Memory (ROM) 310, control system 315, Phase-Lock Loop 320, control register 325, timing controller 330, display controller 335, a color palette lookup 337, an attribute table 339, and output stage 340. The control system 315 receives inputs from the control panel 22 and loads the information for the on-screen display in the page RAM 305.

The page RAM 305 is a memory map which stores the characters and character attributes that will be displayed on the on-screen display 24 of the monitor/television 10. With current monitors having a display resolution of 800×600 pixels, a pixel-by-pixel mapping requires a large amount of page RAM 305, thereby increasing the cost of the on-screen display system 300. To reduce memory requirements, the page RAM 305 contains character identifiers, and character attributes. The character identifiers reference a particular character in a character set preprogrammed in character ROM 310, while the character attributes reference a particular color palette stored in the color palette lookup table 337 and a set of attributes stored in the attribute table 339.

The display controller 335 fetches the contents of the page RAM 305 and causes a graphical pixel representation of the character referenced by the page RAM 305 to be forwarded to the output stage 340 from the ROM 310. Additionally, the display controller 335 implements various character attributes. The output stage 340 then outputs the appropriate Red/Green/Blue (RGB) signals for coloring the pixels 16. The RGB signals must be provided to the monitor/television 10 at a predetermined rate which is based on parameters known as the horizontal synchronization frequency, and the vertical synchronization frequency of the monitor/television 10. The timing of the data transfer is controlled by the Phase-Lock Loop 320, control register 325, timing controller 330.

Figure 5:
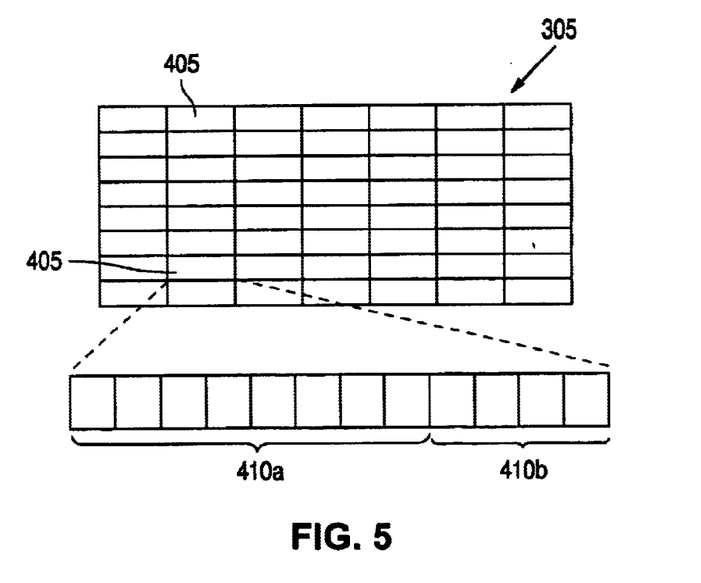
FIG. 5 is a block diagram of a page random access memory in accordance with the presently claimed invention.

Referring now to FIG. 5, there is illustrated a block diagram of the page RAM 305 in accordance with the presently claimed invention. The page RAM 305 comprises memory locations 405, each of which correspond to a particular character unit 110 of the On-Screen Display 24. The memory locations 405 are addressed with the row and column numbers of the On-Screen Display 24 corresponding therewith, in sequence. Each memory location 405 comprises any number of bits 410, including character bits 410a and character attribute bits 410b. The character bits 410a refer to a particular graphical character representation in the character ROM 310, while the character attribute bits 410b refer to a color palette stored in the color palette lookup table 337 and a set of character attributes stored in the attribute table 339. The graphical character representation of the character referenced by the character bits 410a of the memory location 405 is displayed in the corresponding character unit 110. The attributes of the character displayed in the character unit 110 are the particular attribute set in the attribute table 339 referred to by the attributes bits 410b stored in the corresponding memory location 405.

Figure 6:
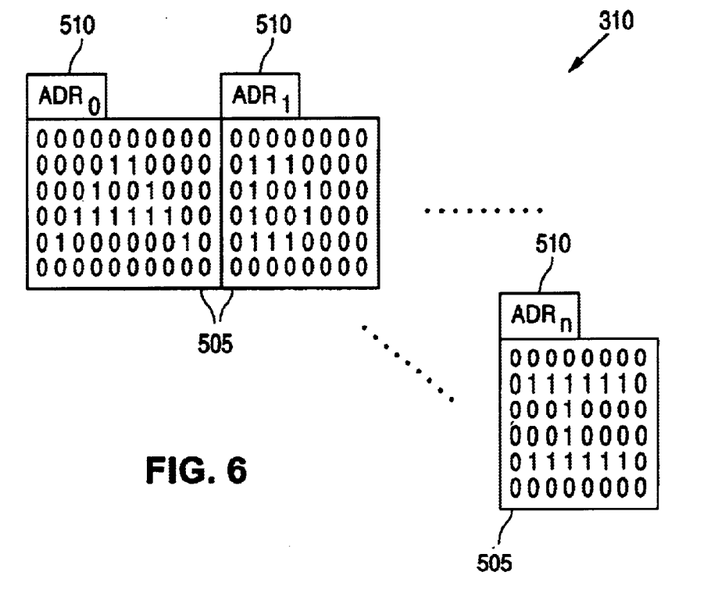
FIG. 6 is a block diagram of a character read only memory.

Referring now to FIG. 6, there is illustrated a block diagram of the character ROM 310. The character ROM 310 stores graphical representations of any number of character bit maps 505. Each character bit map 505 is a pixel-by-pixel map of the character, wherein each bit corresponds to a particular pixel position relative to the character unit 110. A bit can store a logical "1" which indicates that the corresponding pixel should contain a foreground color, or a "0" which indicates that the corresponding pixel should contain a background color. Additionally, each row of the bit map 505 corresponds to a portion of a raster line 14 on the screen 12, relative to the character unit 110. The character bit maps 505 are also associated with an address 510. Accordingly, an entire character bit map 505 can be accessed by reference to the address 510. The page RAM 305 refers to a particular character by storing the address 510 corresponding with a particular bit map 505.

Figure 7A:
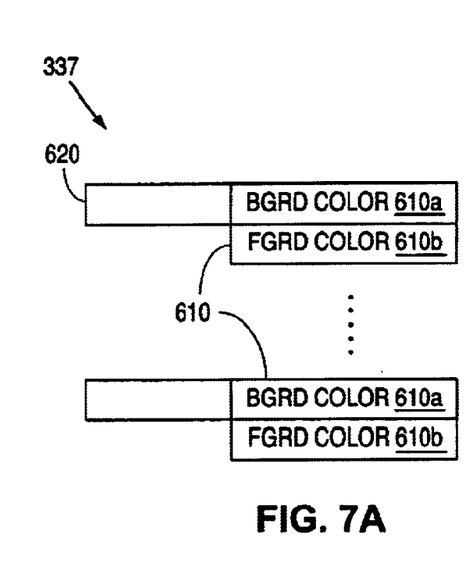
FIG. 7A is a block diagram of the color palette lookup table in accordance with the presently claimed invention.

Referring now to FIG. 7A, there is illustrated a block diagram of the color palette lookup table 337. The color palette lookup table 337 stores any number of color palettes 610. Each color palettes 610 includes a background color 610a, and a foreground color 610b. The foreground color 610b is used to color the pixels forming the character, e.g., the pixels corresponding to a "1" in the character ROM 310, while the background color 610a is used for the surrounding region, e.g., the pixels corresponding to a "0" in the character ROM 310. Each color palette 610 is associated with an address 620. Accordingly, an entire color palette 610 can be accessed by reference to the associated address 620. The page RAM 305 refers to a particular color palette 610 by storing the address 620 corresponding thereto.

Figure 7B:
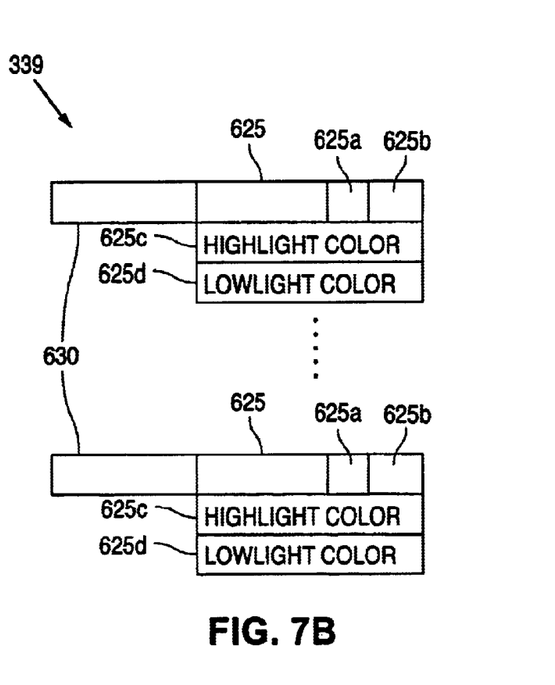
FIG. 7B is a block diagram of the attribute table in accordance with the presently claimed invention.

Referring now to FIG. 7B, there is illustrated a block diagram of the attribute table 339. The attribute table 339 includes any number of enhanced feature registers 625. The enhanced feature register 625 includes bits which indicate certain features such as the box bit 625a which indicates whether the character is to be placed in a box and the raised/depressed bit 625b which indicates whether the box is raised or depressed. Additionally, the enhanced feature register 625 includes a highlight color 625c, and a lowlight color 625d. Each enhanced feature register 625 is associated with an address 630. Accordingly, an enhanced feature register 625 can be accessed by reference to the associated address 630. The page RAM 305 refers to a particular enhanced feature register 625 by storing the address 630 corresponding thereto.

Although the color palette 610 and the enhanced feature registers 625 can be stored in the page RAM 305, storage of the foregoing in the color palette lookup 337 and the attribute table 339 is advantageous because the requirements for the page RAM 305 are reduced. Another advantage is that the color and attributes for character units 110 can be changed more effectively. For example, if several character units 110 each possess certain colors and attributes, the colors and attributes for each character unit 110 can be changed by simply making the change to the color palette 610 in the color palette lookup 337 and the attribute table 339. The attribute bits 405 for each of the character units 110 need not be changed. Instead, the attribute bits 410b will refer to the color palette 610 and enhanced feature register 625 with the modifications.

Figure 8:
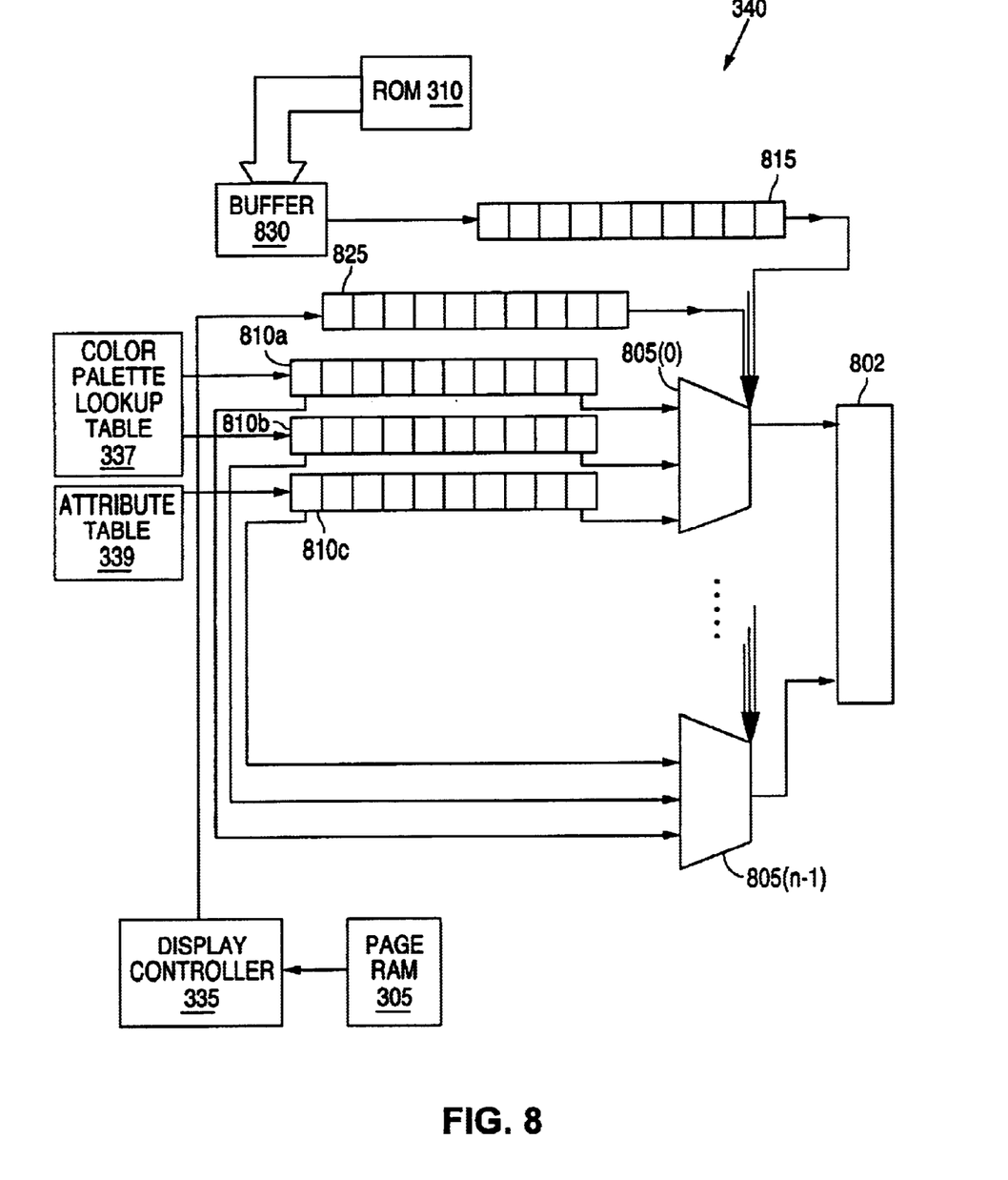
FIG. 8 is a block diagram of an output stage in accordance with the presently claimed invention.

Referring now to FIG. 8, there is illustrated a block diagram of the output stage 340 for selecting an output RGB value and providing the output RGB value to the electron gun 18 by means of an output color register 802. The output stage 340 includes a plurality of decoders 805 and a plurality of color registers 810. The decoders 805 select a particular one of the colors from the color registers 810. Each color register 810 stores a particular color from the color palette 610. For example, the background color 610a is stored in the background color register 810a, and the foreground color 610b is stored in the foreground color register 810b. Additionally, there is included an enhanced feature color register 810c in which either the highlight color 625c or the lowlight color 625d is stored. As will be described below, the determination of loading the highlight color 625c or lowlight color 625d is made by the use of logic incorporated in the display controller 335.

Each decoder 805(0) . . . 805(n−1) is dedicated to outputting a particular bit to the output color register 802. Decoder 805(0) receives the first bit of each of the color registers 810, decoder 805(1) receives the second bit of each of the color registers 810, and decoder 805(n−1) receives the nth bit of each of the color registers 810.

The particular color selected by the decoders 805(1) . . . 805(n−1) are determined by a character line shift register 815, and an overwrite shift register 825. As the electron gun 18 traverses each raster line 14, the character identifiers that occupy the pixels forming the raster line 14 are retrieved from the page RAM 305. The character identifiers are used to address the character ROM 310 to access each character bitmap 505 corresponding thereto. The bits of the row of the character bitmaps 505 corresponding to the raster line 14 are output to the character line shift register 815 in sequential fashion at pixel speed, thereby associating a particular one of the bits to a particular one of the pixels 16. The character line shift register 815 and the overwrite shift register 825 shift out the least significant bit to the decoders 805(0) . . . 805(n−1) to determine the color for the corresponding pixel at the pixel rate. Whenever the overwrite shift register 825 has a 0, the data in the character line shift register 815 is used to determine the output color code, selected either from the foreground color register 810b or the background color register 810a depending upon the pixel value. Whenever a bit of the pixel overwrite register 825 is a 1, the corresponding output pixel is overwritten by the color of the enhanced feature color register, regardless of the pixel value in the character line shift register 815. Those skilled in the art will recognize that a buffer 830 can be used to store several rows of character bitmaps 505 in advance of the character line shift register 815 to permit a certain degree of timing variances.

The decoders 805(0) . . . 805(n–1) select the bits from the color registers 810 based on the least significant bit of the character line shift register 815 and the overwrite register 825. Where the least significant bit of the character line shift register 815 is a "1", the bits of the foreground color register 810b are selected for the output color register 802 while if the least significant bit of the character line shift register 815 is a "0", the bits of the background register color register 810a are selected.

However, the selection of the foreground or background colors can be selectively overwritten by the display controller 335. The display controller 335 implements the shadowed boxes 205, 210 by selectively generating an overwrite mask. The overwrite mask is output to the overwrite shift register 825.

Referring again to FIG. 2, whether the top row 135a or right column 130a of the character unit 110 is to be overwritten is determined by the display controller 335. The display controller 335 determines whether to overwrite by examining the box bit 615a and the raised/depressed bits 615b in the attribute sets 605 for the character unit 110, the character units above 110' and the character unit 110" immediately to the right, as well as based on whether there is a skip line 140 immediately above the character unit 110.

TABLE 1 indicates the determination that the display controller 335 makes for the indicated box bits 615a and the raised/depressed bits 615b of the character unit 110, the character units above 110' and the character unit 110", the display controller 335 performs the action indicated in TABLE 1.

TABLE 1

| Box Bit | Skip Ln Above | Box Bit Above | Box Bit Below | Top Row Action | Right Column |
|---|---|---|---|---|---|
| 0 | 0 | 0 | 0 | None | None |
| 0 | 0 | 0 | 1 | None | HL (LL) |
| 0 | 0 | 1 | 0 | LL (HL) | None |
| 0 | 1 | 0 | 0 | None | None |
| 0 | 1 | 0 | 1 | None | HL (LL) |
| 0 | 1 | 1 | 0 | None | None |
| 0 | 1 | 1 | 1 | None | HL (LL) |
| 1 | 0 | 0 | 0 | HL (LL) | LL (HL) |
| 1 | 0 | 0 | 1 | HL (LL) | None |
| 1 | 0 | 1 | 0 | None | LL (HL) |
| 1 | 0 | 1 | 1 | None | None |
| 1 | 1 | 0 | 0 | HL (LL) | LL (HL) |
| 1 | 1 | 0 | 1 | HL (LL) | None |
| 1 | 1 | 1 | 0 | HL (LL) | LL (HL) |
| 1 | 1 | 1 | 1 | HL (LL) | None |

1 = character unit in box/line skipped
0 = not in box/no skip line
HL = Highlight if Raised/Depressed Bit is Raised
LL = Lowlight if Raised/Depressed Bit is Raised
(HL) =Highlight if Raised/Depressed Bit is Depressed
(LL) =Lowlight if Raised/Depressed Bit is Depressed The logic of TABLE 1 can be implemented by hardcoding the logic into the instruction set of the display controller 335. Alternatively, the logic of TABLE 1 can be implemented in a separate memory module functioning as a lookup table.

Referring again to FIG. 8, when the display controller 335 makes a determination to highlight the top row 135a, the display controller 335 sets all of the bits the overwrite shift register 825 when the top row 135a the character unit 110 is to be scanned and signals the attribute table 339 to output the highlight color 625c in enhanced feature color register 810c. Setting the bits of the overwrite shift register 825 causes the decoders 805(1) . . . 805 (n–1) to select the color from the enhanced feature color register 810c, the highlight color 625c, for each of the pixels 16 in the top row. 135a. When the display controller 335 makes a determination to lowlight the top row 135a, the display controller 335 sets all of the bits of the overwrite shift register 825 for each of the pixels 16 in the top row 135a, and signals the attribute table 339 to load the enhanced feature color register 810c with the lowlight color 625d.

When the display controller 335 makes a determination to highlight the right column 130a, the display controller 335 sets the bit on the overwrite shift register 825 corresponding to the right column pixel 130a in the raster line 14 to be highlighted, and signals the attribute table 339 to load the enhanced feature color register 810c with the highlight color 625c. When the display controller 335 makes a determination to lowlight the right column 130a, the display controller 335 sets the bit on the overwrite 20 shift register 825 and signals the attribute table 339 to load the enhanced feature color register 810c with the lowlight color 625b.

Figure 9:
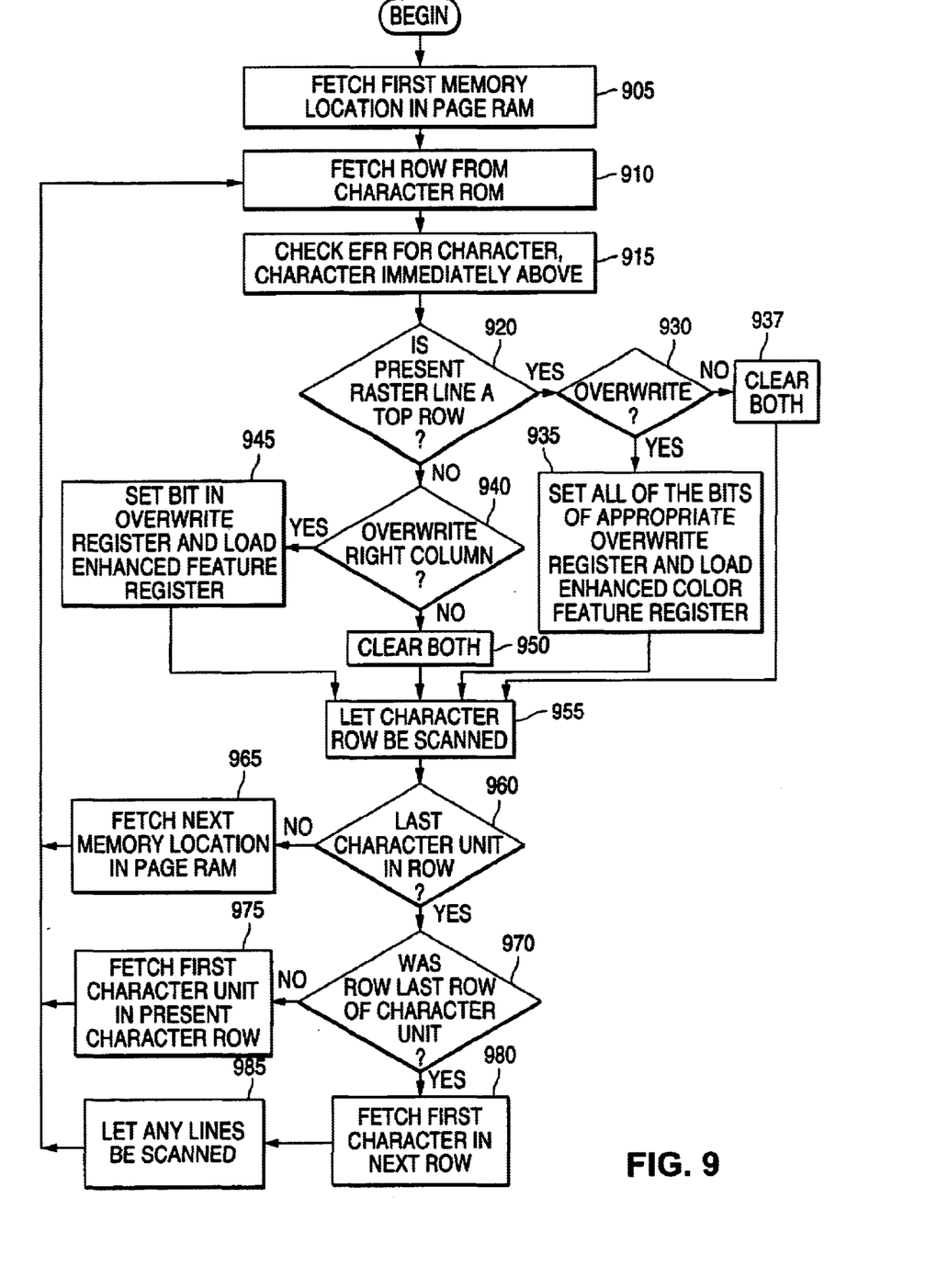
FIG. 9 is a flow diagram describing the operation of the display controller in accordance with the principals of the presently claimed invention.

Referring now to FIG. 9, there is illustrated a flow diagram describing the operation of the display controller 335 in accordance with the principles of the present invention. At step 905 the display controller 335 is at a state where it controls the on-screen display 24 and fetches the first memory location in the page RAM 305. The display controller 335 then uses the character bits 410a to fetch (step 910) the row from the character bitmaps 505 which corresponds to the present raster line 14. At step 915, the display controller 335 checks the box bit 625a, and the raised/depressed bit 625b for the present character unit 110, the character unit 110' directly above, and the character unit 110" immediately to the right. At step 920, the display controller 335 determines whether the present raster line 14 is the top row 135a of a character unit 110. Wherein the present raster line 14 is a top row 135a of a character unit 110, the display controller 335 determines whether the top row 135a is to be overwritten. Wherein the top row 135a is to be overwritten, all of the bits of the overwrite shift register 825 are set and the appropriate color is loaded in the enhanced feature color register 810c (step 935). Where during step 930, the top row 135a is not overwritten, the overwrite shift register 825 is cleared (step 937).

If at step 920, the present raster line 14 is not the top row 135a of the character unit 110, the display processor 335 determines (step 940) whether the right column 130a is to be overwritten. Where the right column 130a is to be overwritten during step 940, the bit of the overwrite shift register 825 which corresponds to the pixel that is in the right column is set and the appropriate color is loaded in the enhanced feature color register 810c (step 945). Where the right column 130a is not to be overwritten, the overwrite shift register 825 is cleared (step 950). After completing step 935, 937, 945, or 950, the display controller 335 waits for the character row 135 to scan (step 955). When the character row 135 has been scanned, a determination (step 960) is made whether the character unit 110 was the last character unit 110 in the character row 115. Wherein the character unit 110 was not the last character unit 110 in the character row 115, the display controller 335 fetches the contents of the next memory location 405 of the page RAM 305 (step 965), and steps 910–955 are repeated.

Wherein the character unit 110 was the last character unit 110 in the character row 115 during step 960, the last pixel 16 in the on-screen display 24 for the current raster line 14 has been scanned. Therefore, the display controller 335 must begin fetching the memory locations 405 corresponding to the next raster line 14. Because each character unit 110 has several pixel rows 135, the character units 110 in the present character row 115 may be only partially displayed. Wherein the pixel row 135 was not the last row in the character unit 110, the display controller 335 must return to the first character unit 110 in the present character row 115. Where the pixel row 135 was the last row in the character unit 110, the display controller 335 must permit any necessary skip lines to be printed and then fetch the first character unit 110 in the next character row 115.

Accordingly, a determination is made whether the pixel row 135 was the last row in the character unit 110 at step 970. Wherein the pixel row 135 was not the last row in the character unit 110 at step 970, the display controller 335 fetches the first character unit 110 in the present character row 115 and repeats steps 910–955. Wherein the pixel row 135 was the last row in the character unit 110, the display controller 335 fetches the first character unit 110 in the next character row 115, lets any skip lines be scanned (step 985) and repeats steps 910–955.

Although an exemplary embodiment illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof.

What is claimed is:

1. A method for displaying a character on a visual display comprising a plurality of character units, said method comprising the steps of:
   fetching contents from a first memory location corresponding to a first particular one of the plurality of character units, the contents comprising character information and attribute information;
   fetching from a character memory a graphical representation of the character, the graphical representation corresponding to the character information;
   fetching attribute information from a second memory location corresponding to a second particular one of the plurality of character units which is located adjacent to the first particular character unit, wherein a mutual border is defined by mutually adjacent portions of the first and second particular character units; and
   determining whether to overwrite a portion of the graphical representation of the character exclusively adjacent the mutual border based on the attribute information fetched from the first memory location and the attribute information fetched from the second memory location.

2. The method of claim 1, wherein the second particular character unit is located immediately above the first particular character unit.

3. The method of claim 1, wherein the second particular character unit is located immediately to the right of the first particular character unit.

4. The method of claim 1, further comprising the step of fetching attribute information from a third memory location corresponding to a third particular one of the plurality of character units, and wherein determining whether to overwrite a portion of the graphical representation of the character is based on the attribute information fetched from the first memory location, the second memory location, and the third memory location.

5. The method of claim 4, wherein the second particular character unit is located immediately above the first particular character unit and wherein the third particular character unit is located immediately to the right of the first particular character unit.

6. The method of claim 1, wherein the step of determining whether to overwrite a portion of the graphical representation of the character comprises determining whether to overwrite a right column of the graphical representation of the character.

7. The method of claim 6, wherein the step of determining whether to overwrite the graphical representation of the character further comprises determining whether to overwrite a top row of the graphical representation of the character.

8. A system for displaying mutually adjacent characters on a visual display comprising a plurality of character units, said system comprising:
   a first character memory circuit for storing a plurality of character information and a plurality of attribute information corresponding to the plurality of character units;
   a second character memory circuit for storing a plurality of graphical representations corresponding to the plurality of character information;
   an attribute memory circuit for storing a plurality of attribute sets corresponding to the plurality of attribute information; and
   a controller for determining whether to overwrite a portion of a particular one of the plurality of graphical representations exclusively adjacent a mutual border based on at least two of the plurality of attribute sets corresponding to at least two of the plurality of attribute information stored in a portion of the first character memory circuit, wherein the at least two of the plurality of attribute sets correspond to first and second mutually adjacent ones of the plurality of character units and the mutual border is defined by mutually adjacent portions of the mutually adjacent character units.

9. The system of claim 8, wherein the controller fetches a portion of the plurality of attribute information from another portion of the first character memory circuit and wherein the controller determines whether to overwrite the portion of the graphical representation based on a third one of the plurality of attribute sets corresponding to the portion of the plurality of attribute information.

10. The system of claim 8, wherein the controller determines whether to overwrite a right column of the portion of the graphical representation.

11. The system of claim 8, wherein the controller determines whether to overwrite a top row of the portion of the graphical representation.

12. The system of claim 8, wherein the first character memory circuit comprises a portion of a page random access memory.

13. The system of claim 8, wherein the character memory circuit comprises a read only memory circuit.

14. The system of claim 8, wherein said attribute memory circuit comprises a volatile memory circuit and said controller modifies a particular attribute set in said volatile memory circuit.

15. A controller for displaying mutually adjacent characters on a visual display comprising a plurality of character units, the controller comprising:

a memory for storing a plurality of instructions, the plurality of instructions operable to cause the controller to:

fetch contents from a first memory location corresponding to a first particular one of the plurality of character units, the contents comprising character information and attribute information;

fetch from a character memory a graphical representation of a character, the graphical representation corresponding to the character information; and determine whether to overwrite a portion of the graphical representation exclusively adjacent a mutual border based on the attribute information associated with the first particular one of the plurality of character units and attribute information associated with a second particular one of the plurality of character units, wherein the first and second particular ones of the plurality of character units are mutually adjacent and the mutual border is defined by mutually adjacent portions of the mutually adjacent character units.

16. The controller of claim 15, wherein the plurality of instructions are further operable to cause the controller to:

determine whether to overwrite the portion of the graphical representation based on the attribute information associated with a third particular one of the plurality of character units.

17. The controller of claim 15, wherein the plurality of instructions are further operable to cause the controller to:

determine whether to overwrite a right column of the graphical representation.

18. The controller of claim 15, wherein the plurality of instructions are further operable to cause the controller to:

determine whether to overwrite a top row of the graphical representation.

* * * * *

UNITED STATES PATENT AND TRADEMARK OFFICE
CERTIFICATE OF CORRECTION

PATENT NO.     : 6,624,815 B1                                                            Page 1 of 1
DATED          : September 23, 2003
INVENTOR(S)    : Morrish It is certified that error appears in the above-identified patent and that said Letters Patent is hereby corrected as shown below:

<u>Column 1,</u>
Line 48, please delete "by" and replace with the following -- be --

<u>Column 2,</u>
Line 67, please delete "know" and replace with the following -- known --

<u>Column 4,</u>
Line 36, please delete "1110R" and replace with the following -- 110R --
Line 46, please delete "principals" and replace with the following -- principles --

<u>Column 5,</u>
Line 54, please delete "palettes" and replace with the following -- palette --

<u>Column 8,</u>
Line 8, please add the following after "highlight color 625c" -- the --
Line 12, please delete "." after "in the top row"

Signed and Sealed this

Sixth Day of January, 2004

JAMES E. ROGAN
*Director of the United States Patent and Trademark Office*